Jan. 16, 1923.
S. H. PHELPS.
TRACTION WHEEL.
FILED MAY 24, 1919.
1,442,583
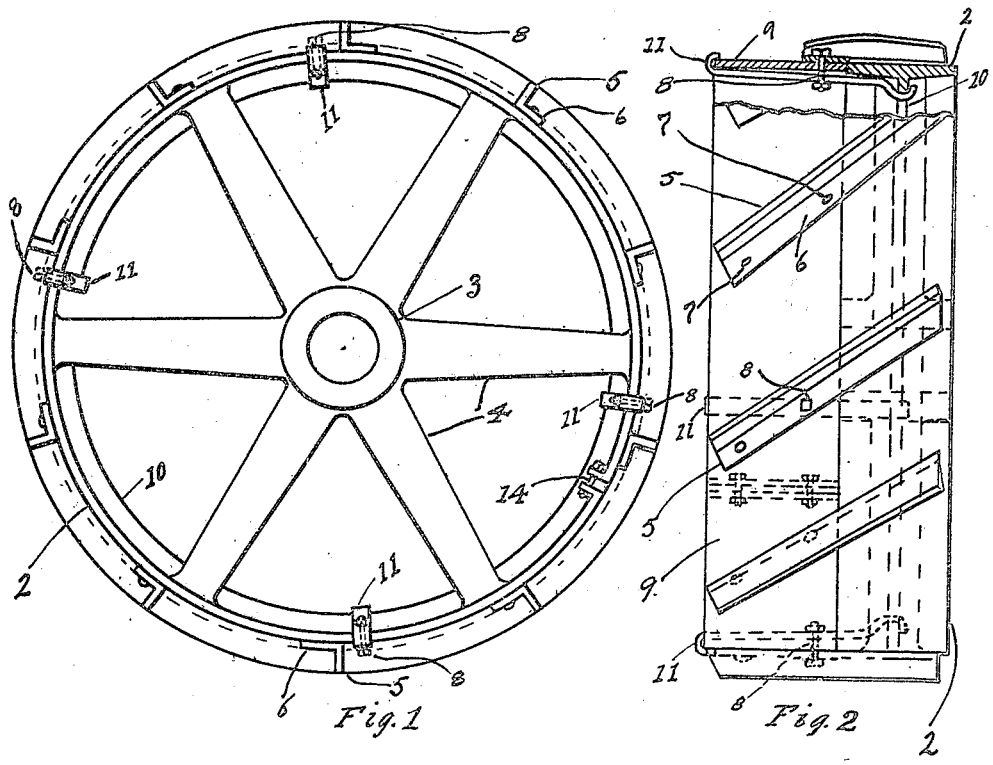
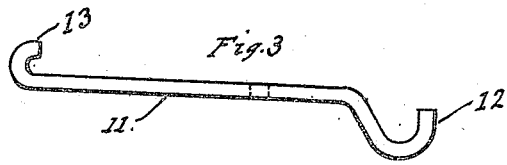
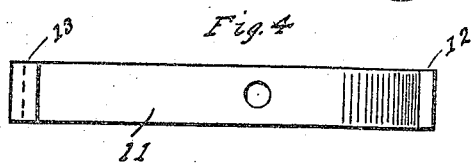
Inventor
Spencer H. Phelps
By *Paul H Paul*
his Attorneys.

Patented Jan. 16, 1923.

1,442,583

UNITED STATES PATENT OFFICE.

SPENCER H. PHELPS, OF MINNEAPOLIS, MINNESOTA, ASSIGNOR, BY MESNE ASSIGNMENTS, TO BEEMAN TRACTOR COMPANY, OF MINNEAPOLIS, MINNESOTA, A CORPORATION OF MINNESOTA.

TRACTION WHEEL.

Application filed May 24, 1919. Serial No. 299,550.

*To all whom it may concern:*

Be it known that I, SPENCER H. PHELPS, a citizen of the United States, resident of Minneapolis, county of Hennepin, State of Minnesota, have invented certain new and useful Improvements in Traction Wheels, of which the following is a specification.

My invention relates to devices for increasing the width of tread of a traction wheel and particularly to a means for securing the extension of the tread to the wheel rim.

A further object is to provide a clamping means for the extension which will hold it rigid while in use and can be easily and quickly mounted on the wheel.

The invention consists generally in various constructions and combinations, all as hereinafter described and particularly pointed out in the claims.

In the accompanying drawings forming part of this specification,

Figure 1 is a side elevation of a traction wheel with my invention applied thereto, Figure 2 is a plan view, showing a portion of the rim in section, Figure 3 is an edge view of the clamp bar, Figure 4 is a top view.

In the drawing, 2 represents the rim of a traction wheel, having a hub 3 and spokes 4 radiating therefrom. 5 represents a series of traction cleats provided with flanges 6 having holes 7 through which bolts 8 pass to secure the cleats to an auxiliary rim 9, one edge of which is adapted to fit the rim 2 and form a lateral continuation of the tread surface of the rim. The cleats 5 extend beyond one edge of the auxiliary rim 9 and lap the tread surface of the rim 2 and bear thereon without being secured, said cleats being obliquely or diagonally arranged, as shown in Figure 2. The main wheel rim 2 has an internal annular flange 10 and for securing the rims together I provide a series of bars 11 having hooks 12 at one end to engage the ring 10, and similar hooks 13 at the opposite end to engage the outer edge of the auxiliary rim 9 and extending in a straight line between said outer edge and the flange 10, leaving a gap or space between the bar and the inner surfaces of the rims. I prefer to arrange these bars so that the bolts 8 may fit within holes 13 therein and when the nuts are tightened, these bars will be bent slightly and drawn toward the inner faces of the rims and put under tension sufficiently to draw the rim 9 snugly against the rim 2 and clamp them securely together, thereby making practically one rim of the two and providing substantially a traction surface of double width of the rim 2. Whenever desired, these bolts may be loosened and clamping bars 11 released and the auxiliary rim detached from the main rim.

I prefer to divide the rim 9 transversely and secure the ends together by means of bolts 14 passing through the inwardly turned ends of the rim. This construction may, however, be modified in various ways. Any suitable number of the clamps 11 may be employed.

I claim as my invention:

1. The combination, with a tractor wheel and rim, of a supplemental rim of substantially the same diameter adapted to fit against one edge of the main rim, bars disposed at intervals around the periphery of said main rim and having means engaging said main and supplementary rims for holding them together, and said bars having means for flexing them to clamp together the abutting surfaces of said rims.

2. The combination, with a traction wheel and rim, of a supplementary rim of substantially the same diameter and adapted to fit against the main rim and means engaging said main rim and said supplementary rim for locking them together, and a series of traction cleats secured only to said supplementary rim and extending over the surface of said main rim.

3. The combination, with a traction wheel having a rim and an internal flange, of a supplementary rim fitting the edge of said traction wheel rim, bars having hooks formed on the ends thereof for engaging the flange of said wheel rim and said supplementary rim, and bolts passing through said bars and said supplementary rim for putting said bars under tension and drawing the abutting edges of said rims together.

4. The combination, with a traction wheel, of a supplementary rim seated against one edge of the wheel rim and forming a traction extension thereof, bars having means at one end in engagement with said supplementary rim and at the other end in engagement with the main wheel rim, and means for flexing said bars to draw said main and supplementary rims together.

5. The combination, with a traction wheel rim, of a supplementary rim fitting one edge thereof, a series of cleats mounted on said supplementary rim and having one end projecting across said main wheel rim but unsecured thereto, and means for clamping said main and supplementary rims together.

6. The combination, with a traction wheel rim, of a supplementary rim fitting one edge thereof, a series of cleats mounted on one rim and having one edge projecting across the other rim but unsecured thereto, and means for clamping said main and supplementary rims together.

In witness whereof, I have hereunto set my hand this 16" day of May 1919.

SPENCER H. PHELPS.